Feb. 20, 1968 C. R. HART 3,369,814

RECORD HANDLING MECHANISM FOR PHONOGRAPHS

Filed July 19, 1965 2 Sheets-Sheet 1

INVENTOR.
CARL R. HART
BY
Lockwood, Woodard, Smith & Weikart
Attorneys

Feb. 20, 1968 C. R. HART 3,369,814

RECORD HANDLING MECHANISM FOR PHONOGRAPHS

Filed July 19, 1965 2 Sheets-Sheet 2

INVENTOR.
CARL R. HART

BY

Lockwood, Woodard, Smith & Weikart
Attorneys

United States Patent Office 3,369,814

Patented Feb. 20, 1968

3,369,814

RECORD HANDLING MECHANISM FOR PHONOGRAPHS

Carl R. Hart, New Haven, Ind., assignor to The Magnavox Company, Fort Wayne, Ind., a corporation of Delaware Filed July 19, 1965, Ser. No. 473,084
2 Claims. (Cl. 274—10)

ABSTRACT OF THE DISCLOSURE

A record changer for either small or large aperture records without addition or removal of parts and including a center-drop spindle for automatic changing of small aperture records and three foldable circularly-spaced spindles for large aperture records. A turntable-mounted gear engaged with pinions serving as mounts for the three spindles and having a finger thereon engageable with a stop operable by change cycle control means to momentarily stop gear rotation as turntable rotation continues, to thereby rotate the three spaced spindles for the drop of a record. A cam on the turntable and follower on the stop member to effect release of the gear after drop of a record, and a return spring on the gear for return to original condition.

This invention relates generally to phonographs and more particularly to phonographs adapted to play records having relatively small centering apertures and records having relatively large centering apertures.

Conventional phonographs are provided with a spindle mounted concentrically with the turntable for centering records having relatively small centering apertures. Such spindles include mechanism for supporting a stack of records above the turntable and dropping one record at a time to the turntable for playing. For adapting such phonographs to play records having relatively large centering apertures it is conventional to provide an adapter which is cylindrical in form and which may be mounted on the relatively small spindle whenever it is desired to play such records. The adapter includes mechanism operated by the record supporting and dropping mechanism of the small spindle for supporting a stack of records having large apertures and dropping them one at a time to the turntable for playing. When such adapters are not in use it is necessary that they be removed from the small spindle and stored either in a receptacle associated with the phonograph or in some other convenient place.

Conventional adapters, as described above, are subject to damage during storage or damage when mounted on the small spindle or removed therefrom which results in malfunction. Such adapters are also relatively complex and expensive to manufacture and repair.

The principal object of this invention is to provide in a phonograph spindle structure for playing records having relatively small or relatively large centering apertures which is an integral part of the phonograph and which comprises relatively simple and inexpensive mechanism.

Another object of this invention is to provide in an automatic phonograph having a spindle adapted to support a stack of records having relatively small centering apertures and to drop one record at a time to the turntable, a second spindle means which may, in effect, be retracted when such small aperture records are being played and to be manually operable into a position for supporting and dropping, one at a time, a stack of records having relatively large centering apertures.

In accordance with this invention there is provided a phonograph for handling records having centering apertures of different sizes comprising a turntable, a first spindle mounted concentrically thereof for supporting and dropping, one at a time, records having relatively small centering apertures, and a second spindle means comprising a plurality of spindles mounted on the turntable in such a manner that they can be positioned to permit playing of records supported on the first spindle means or alternatively positioned for supporting and dropping, one at a time, a plurality of records having relatively large centering apertures.

The full nature of the invention will be understood from the accompanying drawings and the following description and the claims:

Figure 1:
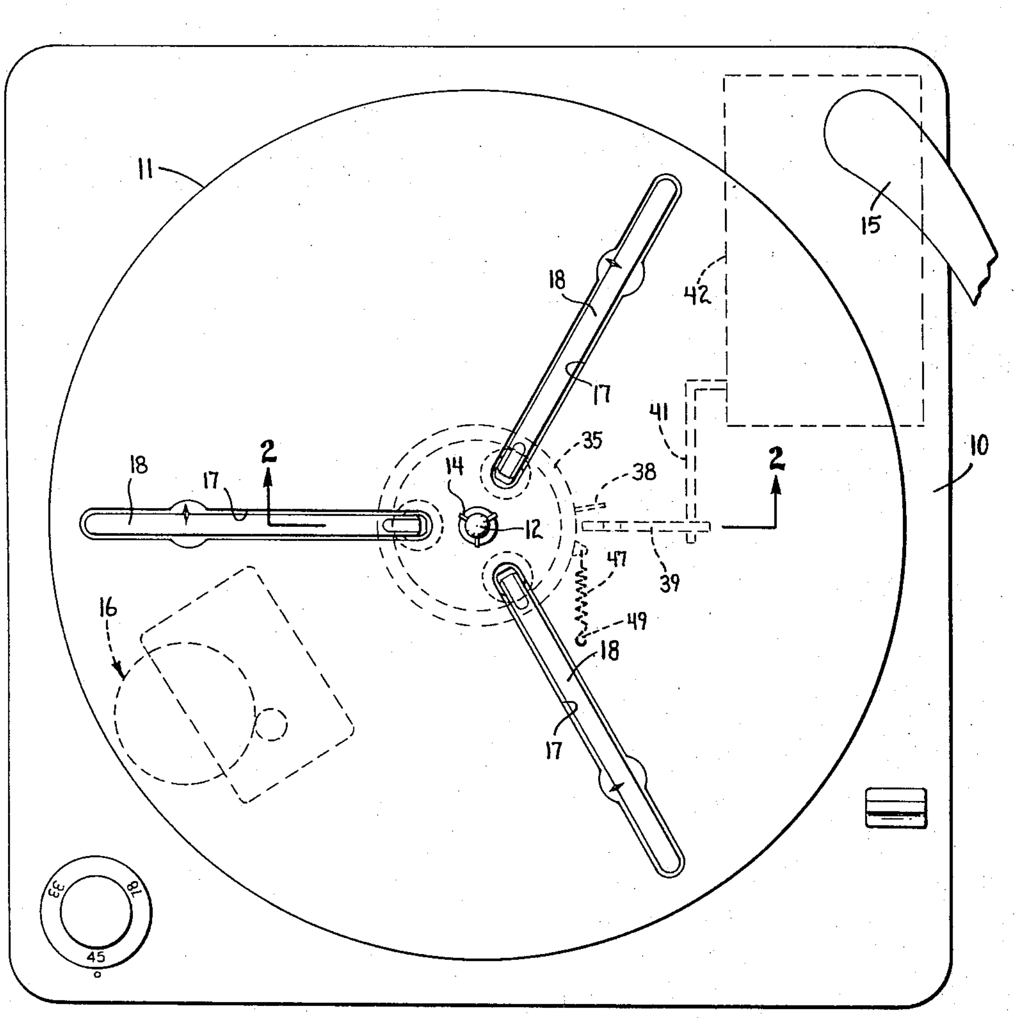
FIG. 1 is a top plan view of a phonograph embodying the spindle structure of this invention and illustrating in a retracted position the spindles which are adapted to support records having relatively large diameter centering apertures.
Figure 4:
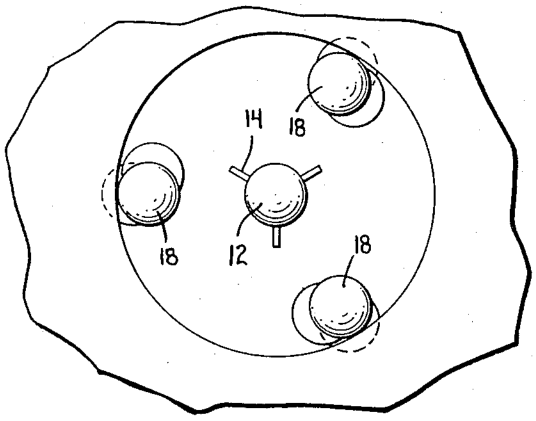
FIG. 4 is an enlarged partial top plan view of the spindle structure illustrating the manner in which large centering aperture records are supported.

Referring to the drawings, FIG. 1 shows an automatic phonograph having a base plate 10, a turntable 11 and a conventional spindle 12 adapted to support a stack of records having relatively small centering apertures. Spindle 12 includes conventional mechanism including fingers 14 for supporting the stack of records and dropping them one at a time to the turntable. A conventional tone arm 15 is mounted to the base plate as illustrated. The turntable 11 may be driven in conventional manner by a motor and drive pulley assembly 16. Turntable 11 is formed to provide channels 17 for accommodating the retractable spindles 18 which are adapted to support and drop one at a time records having relatively large centering apertures. As illustrated in FIG. 1, the spindles 18 are nested in the channels slightly below the record supporting surface of the turntable whereby records having relatively small centering apertures may be played in the usual manner.

The spindles 18 are pivotally mounted in hub portions 20 of pinion gears 21 which, in turn, are rotatably mounted in bearing structure 22 secured to an annular plate 23 fixed to the lower side 24 of the turntable. Each of the spindles is slotted at 25 to receive a pivot pin 26 fixed to the hub 20. Each of the hubs 20 is formed to provide a slot 27 which permits each spindle to be pivoted into its horizontal position. The hubs 20 are also formed to provide a spindle seating hole 28 whereby each spindle may be erected to its vertical position and moved downwardly so that its lower end is captivated for maintaining the spindle in a vertical position.

Figure 3:
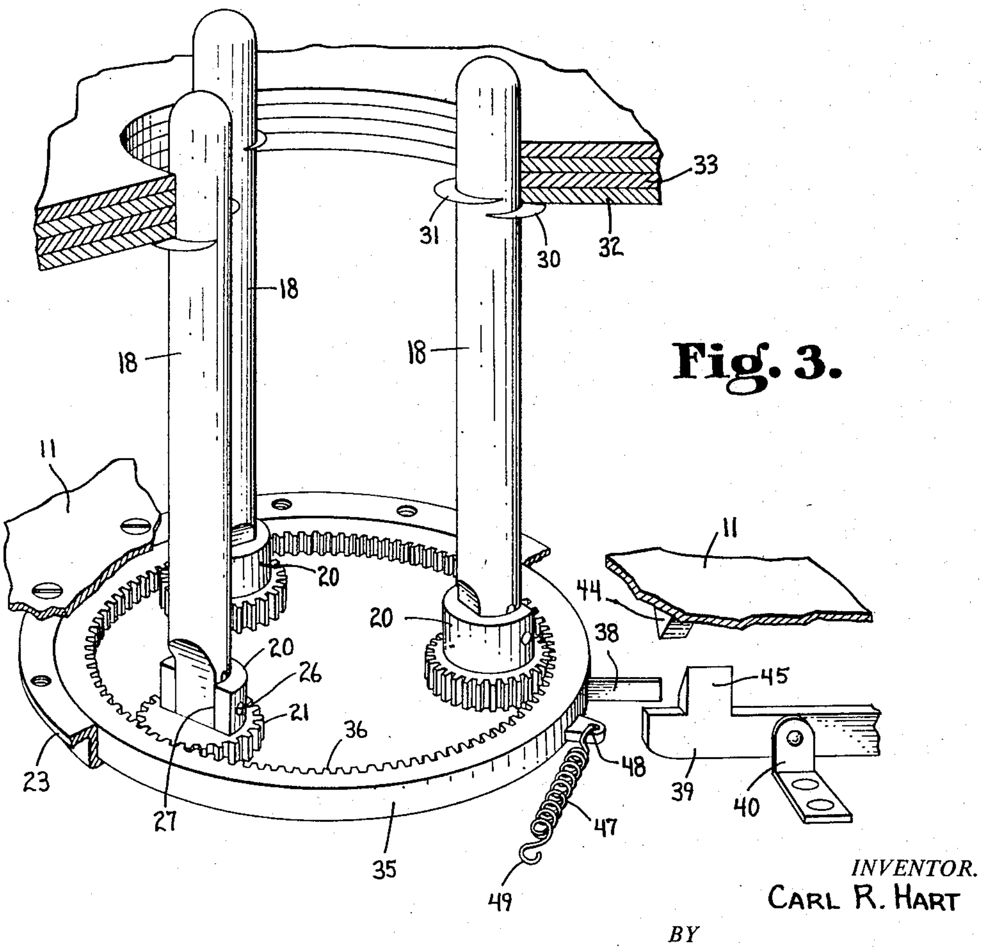
FIG. 3 is a perspective view with parts broken away illustrating the operative position of the spindles which support records having relatively large centering apertures and the control mechanism for operating the spindles to drop one record at a time to the turntable.

Pinions 21 and the spindles are located radially and equidistant from the central spindle 12 and are spaced from spindle 12 at such a distance that records having the relatively large centering aperture will fit closely to the outer peripheries of the spindles. Each of the spindles 18 includes a pair of knife-edged record supports 30 and 31 which are spaced apart a distance equal to the thickness of a record. As shown in FIG. 3, the lowermost support 30 will normally engage the lowermost record 32 of a stack of records, thereby to support the stack. Since the supports 30 and 31 are disposed approximately 180° apart from one another, the spindles may be rotated simultaneously to move the supports 31 beneath the next lowermost record 33 to support all but the lowermost record. As support 31 moves beneath the record 33, support 30 will move out from under record 32 permitting it to drop to the turntable. 360° rotation of the spindles 18 causes the stack of records, including record 33, to drop on to the support 30, whereby record 33 is in position to be dropped to the turntable.

Figure 2:
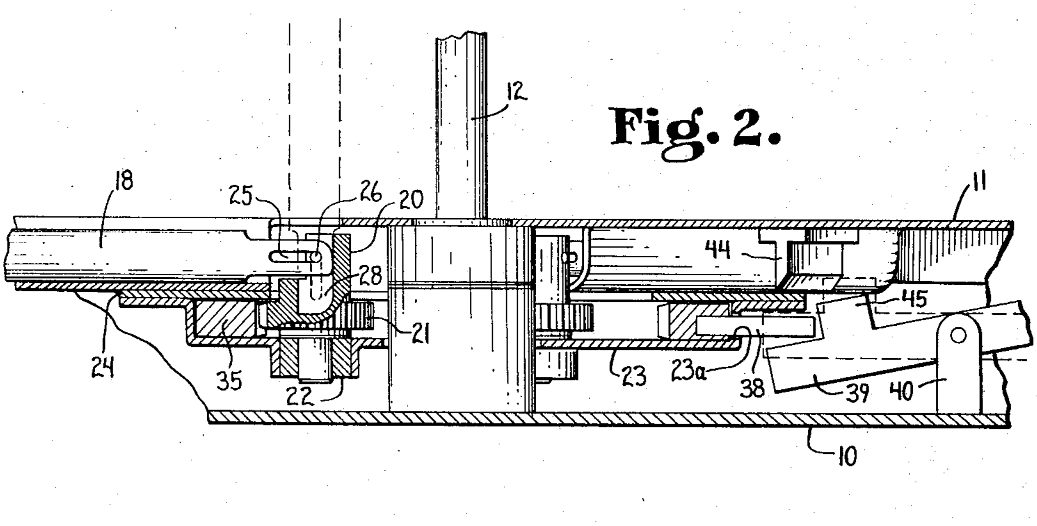
FIG. 2 is a partial cross section taken on line 2—2 of FIG. 1.

For rotating the spindles 18 there is provided a ring gear 35 having internal gear teeth 36 meshing with the teeth of the pinions 21. Gear 35 is supported for rotation on the member 23 which is fixed to the turntable. For causing rotation of gear 35 relative to the turntable there is provided a resilient fingers 38 which is attached to gear 35 in any suitable manner and projects outwardly radially thereof through an elongated slot 23*a* in member 23. A stop member 39 is pivotally mounted on a bracket 40 which is attached to the base plate 10 and is normally positioned, as shown in FIG. 2, out of the path of movement of finger 38. Stop member 39 is coupled to a cam 41 which may be a part of the change cycle control mechanism 42. As will be obvious to those skilled in the art, the cam 41 may be arranged to elevate the stop member 39 into its dotted line position, as illustrated in FIG. 2, where it will engage the finger 38 and cause the ring gear 35 to stop. Bearing in mind that the turntable will be rotating and carrying the pinions 21 with it, it will be apparent that gear 35 will rotate the pinions and the spindles 18 to drop a record as previously described.

It is intended that stop member 39 will engage finger 38 long enough to rotate the spindles 18 through an angle of approximately 180°. For disengaging the stop 39 from finger 38 there is provided a cam 44 fixed to the turntable and projecting downwardly thereof a sufficient distance to engage the upright cam follower member 45 which is a part of and projects upwardly from the stop member 39. Such engagement causes the stop member 39 to assume its full line position and move out of the way of finger 38.

For returning gear 35 to its idle position with respect to the turntable there is provided a tension spring 47 anchored at 48 to gear 35 and anchored at 49 to the turntable. During the time that stop member 39 engages finger 38 spring 47 will be stretched, and when stop 39 disengages from finger 38, spring 47 will return gear 35 to its normal position which, in turn, will rotate the pinions 21 and the spindles to return the supports 30 and 31 to their normal position, as illustrated in FIG. 3

It is intended that any conventional change cycle mechanism may be used for controlling the record changing cycle of both the central spindle 12 and the other spindles 18. As previously described, spindles 18 will be rotated when they are in their vertical position, but when they are in horizontal position it will be apparent that pinions 21 and gear 35 will be locked. In this case no damage will be done as finger 38 is intended to have sufficient resilience to bend and slip by the stop 39. Thus, during a record changing cycle when records are supported on spindle 12, the change cycle mechanism may still operate the stop 39 without in any way damaging the operating machanism of spindles 18.

From the foregoing description it will be apparent that this invention provides means in a record changer for handling records having either large or small centering apertures. The means for handling records having relatively large centering apertures is such that it can be incorporated in a conventional record changer without making any substantial modifications of the change cycle mechanism or of the conventional spindle for handling records having small centering apertures. The invention also provides the advantage that the mechanism for handling large aperture records is an integral part of the record changer mechanism and does not have to be removed and stored when not in use.

The invention claimed is:

1. In an automatic phonograph for playing one record after another including a turntable rotatable on an axis, a first record supporting spindle means mounted concentrically with said turntable for supporting records having relatively small centering apertures and including means operable for dropping one record at a time, means for supporting records having relatively large centering apertures comprising a plurality of second spindles disposed equidistant and radially of said first spindle means, means on said turntable mounting each of said plurality of spindles for movement between a horizontal inactive position and a vertical active position and for rotation of said spindles about their respective vertical axes when in active position, each of said plurality of spindles including record supporting means for supporting a stack of records and operative in response to rotation of said spindles on their axes for dropping one record at a time, and change cycle control means coupled to said spindle mounting means for rotation thereof to rotate said spindles on their axes and drop a record, said spindle mounting means including a pinion gear mounted on each of said second spindles, and said change cycle control means including a ring gear mounted on said turntable for rotation relative thereto and in operative engagement with said pinion gears for rotation of said pinion gears on their axes upon rotation of said ring gear relative to said turntable, said change cycle control means further including a resilient finger attached to said ring gear and normally rotating with said ring gear and turntable about the rotational axis of the turntable for initiating said relative rotation of said ring gear and said rotation of said pinion gears on their axes, said change cycle control means further including a stop member movable into the path of said finger to temporarily impede rotation of said finger and ring gear and thereupon rotate said spindles on their axes, and means for removal of said stop member from the path of said finger after impeding said finger, said finger being sufficiently resilient to deform and pass said stop member without rotating said ring gear and spindles with respect to said turntable when said spindles are in said inactive position.

2. The combination of claim 1 wherein said means for removal include a cam on said turntable and a follower on said stop member, said follower being engageable by said cam during rotation of said turntable after engagement of said resilient finger by said stop member.

References Cited

UNITED STATES PATENTS

| | | | |
|---|---|---|---|
| 2,918,289 | 12/1959 | Hardy | 274—10 |
| 3,080,168 | 3/1963 | Wennerbo | 274—10 |

LEONARD FORMAN, *Primary Examiner.*

ROBERT B. HULL, *Examiner.*

J. M. FREED, *Assistant Examiner.*